Oct. 14, 1969          C. P. VAN DIJK          3,472,902
               HYDROCARBON HALOGENATION PROCESS
                     Filed April 12, 1965
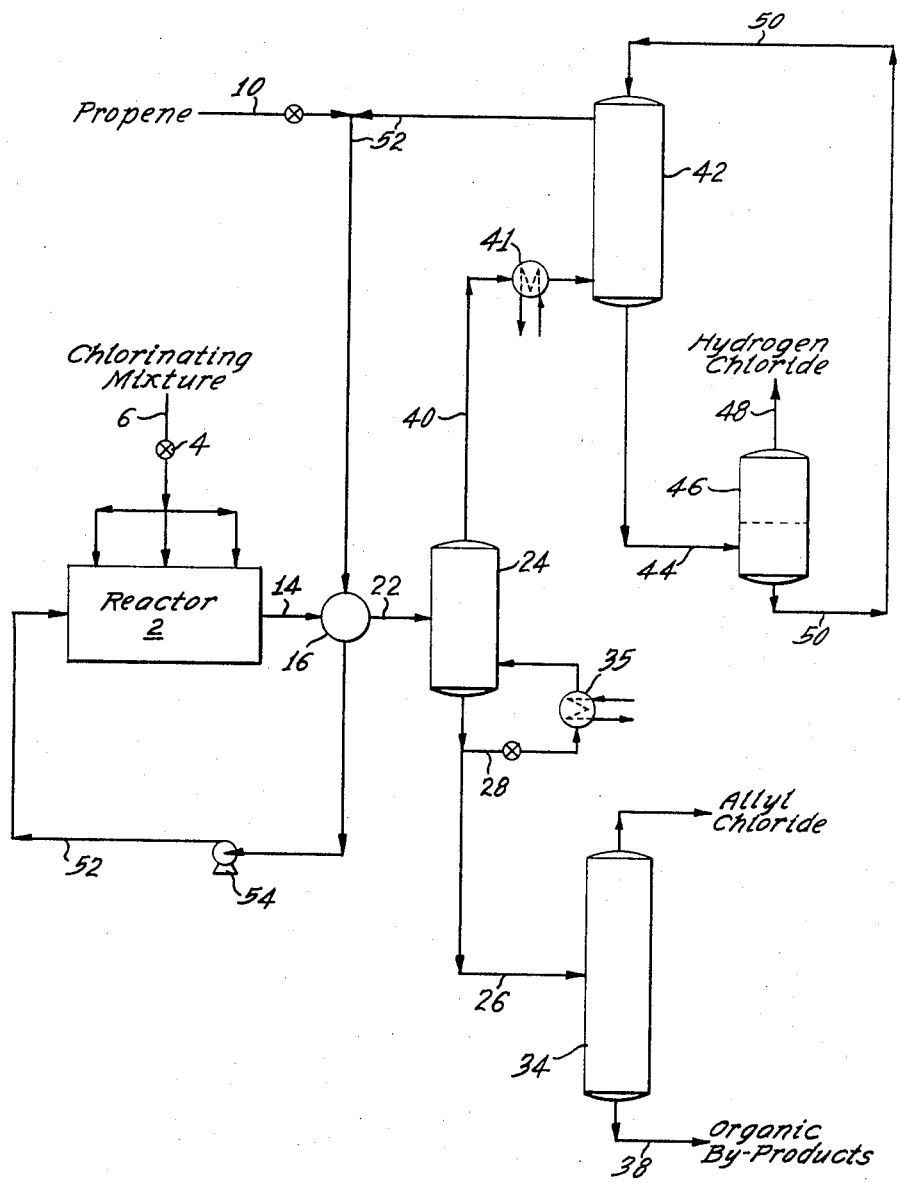

United States Patent Office 3,472,902
Patented Oct. 14, 1969

3,472,902
HYDROCARBON HALOGENATION PROCESS
Christiaan P. van Dijk, Westfield, N.J., assignor to Pullman Incorporated, Chicago, Ill., a corporation of Delaware
Continuation-in-part of application Ser. No. 277,555, May 2, 1963. This application Apr. 12, 1965, Ser. No. 447,257
Int. Cl. C07c 25/06, 21/06
U.S. Cl. 260—650
19 Claims This invention relates to an improved process for the halogenation of hydrocarbons. In one aspect, this invention relates to the chlorination of low molecular weight olefins to produce the corresponding unsaturated chlorohydrocarbon under conditions which minimize formation of by-products.

This application is a continuation-in-part of my prior and copending application Ser. No. 277,555, filed May 2, 1963, now Patent No. 3,356,749.

Many processes for the halogenation of hydrocarbons exist wherein an unsaturated hydrocarbon is treated with a halogen to produce a mixture of products containing some unsaturated halohydrocarbon. However, a large proportion of the products produced are polyhalogenated saturated or unsaturated products of the unsaturated hydrocarbon which do not have the marketability and useful applications of the unsaturated monohalogenated product. These monohalogenated products are valuable in the production of various synthetic materials, e.g., as monomers in the products of valuable polymers. The fact that most processes now being used produce, in the product effluent, only 50–70 percent of the desired unsaturated products and the large amounts of polyhalo by-products in the mixtures obtained, suggests the need for a more selective halogenation process.

Another difficulty with the processes heretofore employed, is that the mixture of products produced have boiling points which do not permit ease of separation. Azeotropes in the product mixture are formed and many steps such as scrubbing, absorption, extraction, multi- distillations, etc., must be employed in order that the valuable unsaturated monohalogenated compounds be recovered. These numerous separation stages militate against efficient and economical operation.

Also, in regard to these mixtures, because of the reactivity of the unsaturated products, side-reactions in the mixtures produced take place in varying degrees depending upon the nature of the particular halogenated olefin and the length of time the reactive species remain in contact. Thus, a more efficient method of treating reactor effluent gases for the separation of components is needed.

It is, therefore, an object of the present invention to provide a process which overcomes the above-mentioned difficulties while at the same time provides for efficient and economic operation for commercial application.

Another object of this invention is to provide a process for producing unsaturated halohydrocarons in high yield and selectivity.

Another object of the invention is to eliminate the difficulties associated with the separation of the unsaturated halohydrocarbon from the reactor effluent.

Still another object of the invention is to provide a completely regenerative process for accomplishing the above objects in an economically attractive process.

Yet another object of the invention is to provide allyl chloride from propylene and chlorine in a selectivity greater than 90 percent by weight.

These and other objects of this invention will become apparent to those skilled in the art from the following description and disclosure.

The invention as hereindescribed relates to an improved method for halogenating a hydrocarbon and to an improved method for recovering hydrogen halide and halogenated product from the effluent mixture. According to this invention, a selective process for the production of monohaloolefin is obtained by halogenating an olefinic hydrocarbon under certain critical conditions. In accordance with the halogenation reaction of this invention, an unsaturated hydrocarbon is reacted with a halogen which has been diluted with liquid inorganic halide under conditions such that a high molecular excess of hydrocarbon to halogen in excess of 5:1, is employed in the reaction zone and the reaction zone is maintained under elevated pressure in excess of 400 p.s.i.g. during halogenation. Conducting the halogenation reaction with diluted halogenating agent under these critical conditions results in high selectivity with respect to the corresponding unsaturated monohalogenated product.

Also, in accordance with this invention, the halogenation reactor effluent obtained is treated in an adiabatic system for the removal of inorganic halide impurities and recovery of product. This improved treatment of reactor effluent consists of passing the effluent in contact with a dilute inorganic halide extraction solution under adiabatic conditions in order to extract from the effluent inorganic halide compounds such as the hydrogen halide and, in most cases, when the effluent is at an elevated temperature, to cool the effluent by direct heat exchange with the dilute solution. The heat of sorption, resulting from the extraction of the inorganic halide compound, is dissipated by flashing the resulting enriched halide extraction solution under adiabatic conditions to vaporize the sorbed inorganic halide and to restore the original concentration of the dilute halide extraction solution. The resulting self-regenerated extraction solution can then be recycled to the extraction zone for further contact with additional quantities of effluent gas after adjusting the temperature to that required in the zone. This may be doone by partially or totally cooling the recycle stream after flashing. The treated effluent from which inorganic halide contaminant, and in some cases water, has been removed is then withdrawn from the extraction zone and the organic halogenated product is recovered.

Although any of the unsaturated hydrocarbons employed in previous precesses for the purpose of halogenation can be used in the improved halogenation process of the present invention, the preferred hydrocarbons are those which are unsaturated and contain between 2 and 7 carbon atoms; most preferred of this class of compounds are those unsaturated compounds selected from the group consisting of ethylene, propene and benzene. Other unsaturated hydrocarbons, particularly useful in this process include butene, butadiene, isoprene, methylbenzene, etc. Also, chlorinated, brominated, chlorobrominated and other halogenated unsaturated derivatives of these hydrocarbons can be suitably employed in the present process to produce the next higher halogenated adduct.

The halogenating agents employed in the present halogenation process can also be any of those employed in previous halogenation processes and include fluorine, chlorine, bromine and iodine. Of the halogenating agents employed, the preferred halogenator, for the purposes of the present invention, is chlorine, since the uses of the chlorinated products are far more extensive and well known than, for example, iodohydrocarbons which, in some cases, are relatively unstable.

In the improved halogenation process of the present invention, halogenating agent is diluted with an inorganic halide such as hydrogen halide in the liquid phase to produce a liquid feed mole ratio of at least 1:1 halide to halogen and the mole ratio of the unsaturated hydrocarbon to halogen fed to the reaction zone is maintained in excess of at least 5:1, preferably a mole ratio between about 10:1 and about 20:1 is employed. The hydrocarbon and halogen are reacted under turbulent conditions in a reaction zone maintained at a pressure above 400 p.s.i.g., preferably above 500 p.s.i.g., and most preferably, between 1300 p.s.i.g. and 2000 p.s.i.g. In the feed to the reactor of the presently improved process, the mole ratio of olefin e.g., propylene, to combined halogen e.g. chlorine, and halogenated product, e.g. allyl chloride, which is not recovered from the recycle stream is also in excess of 5:1. The dilution of the halogen in the liquid phase and pressure are critical factors in obtaining high selectivity in the production of monohaloolefin product. A greater excess of hydrocarbon can be provided by dilution if desired; however, from an economic standpoint, a larger excess is not recommended since it is not required to obtain satisfactory yields of the desired product and high selectivity of the process. The compounds in the reaction zone are reacted at temperatures up to 800° C., preferably, in the case of aliphatic unsaturated hydrocarbons, at a temperature between 450° C. and 600° C., although temperatures of about 200° C. or lower can also be employed. Multi-point introduction of the halogenating agent liquid mixture has been found to improve mixing and turbulence in the reaction zone and is, therefore, recommended. It has also been found to increase the yield of halogenated product.

The high selectivity of monohalogenation of the olefin reactant is not realized unless the dilution of the halogenating agent in the liquid is maintained to provide a molar excess of hydrocarbon to halogenating agent in excess of 5:1. Dilution of the halogenating agent assures avoidance of incidents where, due to local concentration of the halogen, the generation of heat in local areas is sufficient to induce explosion. The introduction of the liquid halogenating agent mixture allows for vaporization and controlled internal cooling of the reactants in the reaction zone. The halogenating agent, e.g., normally gaseous halogen, employed in this reaction is preferably diluted with liquid hydrogen halide having the same halogen as the halogenating agent. The resulting halogenating medium, upon introduction to the reaction zone, is in a mole ratio of between about 1:1 and about 10:1 or higher with respect to hydrogen halide, preferably for chlorine, between about 2:1 and about 6:1 hydrogen chloride:chlorine. It is also found that the degree of dilution decreases as the atomic number of the halogen increases. Thus, when fluorine is the halogenating agent, dilution with dydrogen fluoride in a mole ratio of at least 6:1 is recommended. It is now discovered that dilution of the halogenating agent not only provides better temperature control in the reaction zone, but also minimizes the formation of saturated by-products, while eliminating the necessity for pre-mixing reactions prior to their introduction into the reaction zone. The high molar excess of hydrocarbon in the reaction zone provides the high selectivity to the monohalogenated product and the high pressure under which the reaction is conducted facilitates the recovery of reaction products since the products can be separated from their mixtures by simple condensation in heat exchange with cooling water. Thus, the present process not only provides economic improvements in the commercial operation of halogenation processes, but also improves the efficiency and selectivity of halogenation processes in general.

The pressure at which the reaction zone is maintained in the highly selective process is an important factor contributing to the high conversion to unsaturated monohalogenated hydrocarbon product. Pressures between about 400 p.s.i.g. and about 4000 p.s.i.g., preferably between 500 p.s.i.g. and 3000 p.s.i.g., most preferred between 1300 p.s.i.g. and 2000 p.s.i.g. are advantageously employed. The more dilute halogen gas mixtures, e.g., at least 4:1 mole ratio of hydrogen halide:halogen, are preferred for the higher pressures, e.g., 1200 p.s.i.g. and above. At the higher pressure, a direct isolation of liquid hydrogen chloride by condensation is possible, preferably by the use of cooling water alone. In these cases, pressures between 1000 p.s.i.g. and 2000 p.s.i.g. are advantageously employed.

After reacting the components of this process under the critical conditions given above, the reactor effluent gases can be subjected to the improved recovery treatment described in copending patent application Ser. No. 277,555, filed May 2, 1963, wherein the effluent is contacted with an inorganic halide extraction solution in an adiabatic system. Although an aqueous solution of the hydrogen halide is the preferred extraction medium, solutions also containing metal halide extraction agents such as, for example, lithium chloride and calcium chloride, when the extraction solution and the effluent contains hydrogen chloride, can also be employed. Certain advantages are gained in employing these chlorides. For example, when treating reactor effluent gases containing water in addition to hydrogen halide contaminant, hygroscopic lithium chloride has been found to reduce the water content of the effluent gas.

When the olefin of the halogenation reaction is introduced into the reaction zone in undiluted condition, no contaminant is present in the reactor effluent; however, in cases where a solution of the olefin is introduced, e.g., solutions in halogenated hydrocarbons, contaminant is present in the reactor effluent and should be removed to obtain pure product.

Other liquid media having boiling points above the hydrogen halide and having a higher boiling point than water, in cases where water is also extracted from the reactor effluent, can be used to dilute the extraction agent. In the case of reactor effluents having a relatively high water content, a non-aqueous liquid extraction medium is advantageously restored to its original concentration by flashing off both sorbed hydrogen halide and sorbed water in a single operation.

The gaseous effluent from the reactor in any of the halogenation processes herein discussed, is preferably passed in countercurrent contact with the halide extraction liquid and is thereby treated for the removal of inorganic halides, preferably at a temperature of between about 10° C. and about 100° C. When the reactor effluent contains water and halohydrocarbons having from 2 to 7 carbon atoms, the effluent is dried to a water dew point of between 30° C. and 60° C. or less, under which conditions, a substantially anhydrous, halide-free effluent mixture is obtained.

The resulting halide-enriched solution which is heated as a result of direct heat exchange with the effluent gas and/or the heat of sorption, is then flashed to restore its original concentration and temperature for recycle to the extraction zone. The relatively pure hydrogen halide withdrawn as a gas from the flashing zone can, if desired, be condensed and recycled in a controlled amount to establish the concentration of the halogenating agent in the halogenation reaction zone.

In the extraction step, it is now discovered as a particular aspect of this invention, that when a high volume ratio of hydrogen halide extraction liquid to hydrogen halide gas in the effluent, e.g., above 10:1 is maintained in the extraction zone, preferably between about 15:1 and about 100:1 by weight, optimum cooling of effluent and an advantageous heat exchange and heat of sorption is given up to the extraction medium to provide maximum efficiency in flashing. Surprisingly, under these conditions, the sorption of hydrogen chloride can be effected up to about 7 percent of the hydrogen chloride in the initial extraction media.

A portion of the effluent gases from the extraction zone, containing in addition to halogenated product, unreacted hydrocarbon, can be recycled, at least in part, to the reaction zone as a portion of the feed thereto after the desired unsaturated monohalogenated hydrocarbon product is separated from the mixture.

Between the reaction zone and the extraction zone, at least three separate methods of treating the reactor effluent gas can be employed. For example, the reactor effluent gases can be cooled and passed directly to the extraction zone wherein condensation of the unsaturated monohalogenated hydrocarbon is effected simultaneously with the extraction of the hydrogen halide from the mixture. Another alternative is to cool the effluent gases from the reactor so that at least a portion, preferably a major portion, of the unsaturated monohalogenated hydrocarbon is condensed from the mixture and then subject only the remaining gaseous mixture to the halide extraction. Still another alternative is to pass the reactor effluent gases without cooling directly into the extraction zone to remove inorganic halides therefrom, and after removing the gaseous mixture from the extraction zone, to either condense out the desired monohalogenated hydrocarbon or to condense the entire mixture and distill the desired monohalogenated hydrocarbon from the condensate. In the last case, the extraction is performed at relatively high temperatures, for example, between about 150° C. and about 225° C.

The extraction medium, most preferably being aqueous hydrogen chloride, is an aqueous solution of between about 18 percent and about 40 percent by weight halide concentration. Although it is to be understood that other solutions of the hydrogen halide such as hydrogen halide dissolved in dioxane, higher boiling ethers can be employed, if desired, to replace water either totally, or in part. The concentration of inorganic halide in the liquid medium can vary from about 15 percent to about 40 percent, although a halide concentration of from 20 percent to 30 percent is preferred.

Reference is now had to the drawing which illustrates a specific embodiment of this invention and is not to be construed as in any way limiting to the scope of the present invention.

The drawing illustrates the process as it applies to the preparation of allyl chloride obtained from the reaction between propene and chlorine; although, it is to be understood that in the process described below, other unsaturated hydrocarbons such as, for example butylene, chlorobutylene, chloropropene, etc., can be substituted for propene to provide the corresponding butylene chloride, dichlorobutylene or dichloropropene, and other halogenating mixtures such as, for example, bromine-hydrogen bromide can be substituted to produce the corresponding mono- or dibrominated product. In the embodiment shown by the drawing, a liquid mixture of 1 mole of chlorine and 4 moles of hydrogen chloride are introduced into chlorination reactor 2 by multi-point injection from valved line 6 wherein valve 4 controls the amount of chlorinating mixture introduced to maintain a mole ratio of 15:1 propene:chlorine fed to the reactor. About 16.5 moles of a propene mixture containing 1.5 moles of hydrogen chloride is also introduced into reactor 2 for linear flow therethrough from line 52. The reactor is maintained under 500 p.s.i.g. and at a temperature ranging from 460° C. to 510° C. and turbulence is maintained therein by the multi-point injection of chlorinating agent against the linear flow of unsaturated hydrocarbon. The gaseous reaction mixture is passed through the reaction zone at a rate of 21.5 moles per hour and is withdrawn at a temperature of about 510° C. by means of line 14 and cooled in indirect heat exchanger 16 to about 225° C. The effluent withdrawn from heat exchanger 16 by means of line 22 contains 0.95 mole of allyl chloride, 14 moles of unreacted propene, 6.5 moles of hydrogen chloride and a small amount of dichloropropene. This effluent is then introduced into the middle of distillation tower 24 and the top of this tower is maintained at 50° C. Substantially all of the allyl chloride and higher boiling materials condense and are withdrawn from distillation tower 24 by means of line 26 and a bleed stream is drawn off by means of line 28, heated in heater 35 to a temperature of 75° C. and recycled to reboiler tower 24. The liquid mixture is passed from line 26 into distillation column 34 wherein vapourous allyl chloride is recovered as the product of the process.

The uncondensed gaseous portion consisting of a mixture of hydrogen chloride and propene, under a pressure of 485 p.s.i.g., is withdrawn from tower 24, warmed up to 90° C. in steam-fed heat exchanger 41, and passed by means of line 40 into extraction zone 42 wherein at a temperature of about 85° C., under 475 p.s.i.g., the gaseous mixture is countercurrently contacted with a 36 percent aqueous solution of hydrogen chloride. The feed stream of this liquid in extraction zone 42 is maintained at about 100 parts by weight per part of hydrogen chloride absorbed. In the extraction zone, about 75 percent of the hydrogen chloride gas is absorbed in the 36 percent hydrogen chloride solution so that the hydrogen chloride solution, which is withdrawn from the lower portion of the extraction zone by means of line 44, is enriched to a hydrogen chloride concentration of 36.6 percent. The liquid withdrawn in line 44 has been heated in zone 42 to a temperature of about 90° C. by the direct heat exchange with the vapors from line 40, and by the heat of sorption. This increased heat which is controlled by the gas:liquid ratio in zone 42 is used to flash off excess hydrogen chloride and to restore the enriched solution to its original concentration in flashing zone 46 which is maintained at a temperature of 85° C. and a pressure of 22 p.s.i.g. The liquid from line 44 is passed into the lower portion of zone 46 and substantially pure hydrogen chloride is vaporized and is withdrawn by means of line 48. At least a portion of the hydrogen chloride can be used as diluent for chlorine feed in line 6, if desired, after absorption in liquid chlorine and compression to the inlet pressure to provide a liquid mixture.

The remaining liquid in zone 46, which is restored to its original 36 percent hydrogen chloride concentration, and which is cooled to a temperature of about 85° C. by virtue of flashing, is then withdrawn from the lower portion of the flashing zone and re-introduced into the top of extraction zone 42 by means of line 50 for further countercurrent contact with effluent gases from line 40. The extraction zone is maintained under 475 p.s.i.g.

The effluent gas which has been subjected to extraction and from which a substantial amount of hydrogen chloride has been removed, is withdrawn from the upper portion of zone 42 by means of line 52, mixed with 1 mole of fresh propene feed introduced into line 52 by means of valved line 10 in an amount sufficient to maintain the 15 moles of propene in the feed to reaction zone 2 and the combined vapors in line 52 are passed through indirect heat exchanger 16 for indirect heat exchange with reactor effluent before being recycled to reactor 2 by means of pump 54 in line 52. In heat exchanger 16, the propene feed mixture is heated to a temperature of 460° C. and the reactor effluent gases are cooled to 225° C. The heated propene feed is then returned to reactor 2 and reacted with chlorine in a molar proportion of 15:1.

The allyl chloride product mixture condensed in distillation tower 24 containing only trace amounts of other organic by-products such as dichloropropene and dichloropropane is passed by means of line 26 into distillation zone 34 wherein at a temperature of 47° C. under 1 p.s.i.g., allyl chloride is recovered as a vaporous product in line 36 and the remaining liquid containing the organic by-products is withdrawn from the distillation zone by means of line 38.

It is to be understood that in the above embodiment bromine or iodine can be substituted for chlorine and hydrogen bromide and hydrogen iodide can be respectively substituted for hydrogen chloride in the production of the corresponding allyl bromide or allyl iodide compounds.

The following example illustrates the improved process for the production of allyl chloride wherein propene is reacted with the diluted halogenating mixture of the present process. It is to be understood, however, that other olefinic compounds such as, for example, butene, butadiene, etc., can be substituted for propene in this example and that other halogenating mixtures such as, for example, hydrogen bromide-bromine can be substituted to obtain the high selectivity to the corresponding monohalogenated product.

EXAMPLE 1

Fifteen moles of propene and a liquid mixture of 1 mole of chlorine and 4.5 moles of hydrogen chloride are injected at 460° C. under 1000 p.s.i.g. into a reaction zone where they are contacted under turbulent conditions. A conversion of 6.4 percent of 96 selectivity to monochloropropene is obtained in the reactor and the 20.5 moles of exit gas are passed to a heat exchanger wherein the gaseous mixture is cooled to 75° C. In this heat exchange operation, a portion of the gases are condensed and the resulting gaseous and liquid mixture is fed to a distillation tower wherein at a top temperature of 42° C. and a bottom temperature of 128° C. under 990 p.s.i.g., propene, allyl chloride and higher boiling products are recovered as a liquid fraction. This liquid fraction is then passed to a second distillation tower wherein at a top temperature of 43° C. and a bottom temperature of 150° C. and a pressure of 260 p.s.i.g. allyl chloride and higher boiling products are recovered as a liquid fraction, while the overhead propene vapor is recycled to the reactor. The liquid is finally passed to a third distillation tower from which allyl chloride is separated as the vaporous product from the liquid by-products at a temperature of 45° C. under 15 p.s.i.g. The vaporous hydrogen chloride, the top product of the first distillation tower, is condensed at 42° C. and a portion is admixed with feed chlorine to provide a mole ratio of 4.5:1 in a liquid mixture and recycled to the reaction zone as the chlorination feed thereto.

The liquid propene fraction condensed at the top of the second distillation zone is withdrawn and pumped in indirect heat exchange with effluent gases from the halogenation reactor and then heated in a second heat exchanger to a temperature of 460° C. and recycled to the halogenation reaction zone under a pressure of 1000 p.s.i.g. Fresh propene feed is added to this recycle stream, before it is heated, to provide a mole ratio of propene to chlorine entering the reactor of about 15:1.

This example illustrates the embodiment in which extraction and vaporization for the separate recovery of hydrogen chloride and propene are eliminated and the recovered reactants are directly recycled to the reaction zone after adjusting the temperature and pressure.

EXAMPLE 2

Benzene (14 moles) and a liquid mixture of 5 moles of chlorine and hydrogen chloride (in a mole ratio of 1:4) are fed into a reaction zone wherein at a temperature of about 350° C. under 400 p.s.i.g., the chlorine reacts with benzene to produce monochlorobenzene in about 10 perecent yield and 95 percent selectivity. The gaseous product mixture containing benzene, monochlorobenzene, polychlorinated benzenes, and hydrogen chloride is withdrawn and cooled in a heat exchanger to a temperature of 90° C. This cooled material is then passed to a condenser tower wherein, at a temperature of 42° C. under 290 p.s.i.g., benzene, the monochlorobenzene and higher boiling materials are condensed. The gases are contacted at the top of this tower with a stream of monochlorobenzene at a temperature of 42° C. The cooled gases at the outlet of this tower are practically pure hydrogen chloride and contain only a trace of chlorobenzene. This gas is compressed, recycled to the inlet of the reactor and mixed with chlorine prior to introduction into the reactor. The liquid is withdrawn at the bottom of the tower, recycled through a reboiler heater at a temperature of 225° C. The resulting liquid and vapors are sent back to the bottom of the tower. Part of the liquid is withdrawn so as to keep a constant level in the bottom of the condenser tower, and fed to a distillation tower, wherein at 10 p.s.i.g., a top temperature of 100° C. and a bottom temperature of 154° C., a separation is made between benzene and the chlorobenzenes. The chlorobenzene condensate mixture is passed to a second fractionation zone to separate chlorobenzene from by-products, such as dichlorobenzene. The chlorobenzene can be used as such or can be hydrolyzed to phenol.

EXAMPLE 3

Ten moles of ethylene and a liquid mixture of 1 mole chlorine and 4 moles of hydrogen chloride were introduced into a reaction zone of 500° C. under 1200 p.s.i.g. Entering the reaction zone, the mole ratio of hydrogen chloride to chlorine is maintained at a mole ratio of 4:1 and the mole ratio of ethylene introduced into the reaction zone is maintained at a 10:1 mole ratio of ethylene: chlorine. Turbulent conditions are maintained in the reaction zone aided by multi-point addition of the liquid mixture along the linear flow path of the ethylene so that localized contact of ethylene with halogenating mixture can be as high as 100:1 or higher. In the reaction zone, of the 0.9 mole of ethylene reacted, 0.8 mole of ethylene was converted to vinyl chloride, 0.05 mole to dichloroethylene and 0.05 mole to dichloroethane. Vinyl chloride was recovered as the product of the process from the reactor effluent and the remaining portion of the reactor effluent was recycled to the reactor. If desired, the dichloroethane can be recycled to the reactor with the ethylene feed as a diluent therefor.

EXAMPLE 4

A gaseous mixture of 10 moles of ethylene, 14 moles of hydrogen chloride and 1.2 moles of dichloroethane, and a liquid mixture containing 1 mole of chlorine and 2 mole of hydrogen chloride are introduced at 500° C. under 400 p.s.i.g. into a metal reactor where turbulence is maintained by multi-point introduction of the liquid mixture along the linear flow path of gaseous ethylene. A conversion to 1.9 moles of vinyl chloride and 0.05 mole of dichloroethylene was obtained, together with 0.2 mole unconverted 1,2-dichloroethane. The reactor effluent also contained 18 moles of diluent hydrogen chloride and 9 moles of unreacted ethylene.

The reactor effluent (29.2 moles) was then separated by condensation and distillation to recover vinyl chloride product, dichloroethylene and 1,2-dichloroethane as separate liquid streams and a mixture of ethylene and hydrogen chloride as a vaporous overhead stream from the condensation zone. The vaporous overhead stream was divided into two equal portions. Three-quarters of one portion was recycled to the reaction zone and a one-quarter portion, containing 1.1 moles ethylene and 2.2 moles hydrogen chloride was passed to an oxychlorination zone. The remaining half portion, 4.5 moles of ethylene and 9 moles of hydrogen chloride recovered from the condensation zone, were passed to an extraction zone for recovery of hydrogen chloride by absorbing the hydrogen chloride in an aqueous extraction liquid of 25 percent hydrogen chloride. The unabsorbed ethylene, together with 7 moles of hydrogen chloride is removed from the top of the extraction tower and recycled to the reaction zone together with 2.1 moles of ethylene as fresh feed to maintain the 10 moles feed of ethylene. The hydrogen chloride solution containing absorbed hydrogen chloride and utilizing the heat of sorption is flashed to restore the original concentration of the hydrogen chloride solution thus removing only that portion of hydrogen chloride absorbed in the extraction zone as vapors from the flashing zone. The remaining liquid portion of the regenerated hydrogen chloride solution is recycled to the extraction zone at the temperature and pressure employed therein. The flashed hydrogen chloride (2 moles) is passed to a dryer and then to a compressor after which it is absorbed in the liquid chlorine feed at 800 p.s.i.g. In the oxychlorination zone, in the presence of oxygen, the hydrogen chloride and the ethylene recovered from the condensation zone are converted to 1,2-dichloroethane. The dicholoethane from the oxychlorination zone (1 mole) is recycled to the reaction zone together with the recovered dichloroethane, for a total feed of 1.2 moles.

It is to be understood of course that other aromatic hydrocarbons can be substituted for benzene in the above example and that other halogenating agent mixtures such a hydrogen fluoride-fluorine, hydrogen bromide-bromine and hydrogen iodide-iodine can be substituted for hydrogen chloride-chlorine in the above example to provide the monohalogenated product.

Having thus described my invention I claim:

1. In a process for halogenating a compound containing a double bond selected from the group consisting of a hydrocarbon and a halohydrocarbon containing from 2 to 7 carbon atoms with halogen in a reaction zone, the improvement which comprises: diluting the halogen with a liquid hydrogen halide to provide a liquid mixture having a mole ratio of hydrogen halide to halogen of at least 1:1 and to provide a mole ratio of said compound to halogen in excess of 5:1; introducing the liquid mixture into the reaction zone and reacting said compound with halogen under a pressure of at least 400 p.s.i.g. and at a temperature between about 200° C. and 800° C. in the reaction zone to selectively produce the halogen derivative wherein a hydrogen atom of said compound is substituted by a halogen atom of the halogenating mixture.

2. The process of claim 1 wherein the said compound is a chlorohydrocarbon.

3. The process of claim 1 wherein the said compound is benzene.

4. The process of claim 1 wherein said compound is an unsubstituted hydrocarbon olefin.

5. The process of claim 1 wherein the hydrogen halide is hydrogen chloride and the halogen is chlorine.

6. The process of claim 1 wherein the hydrogen halide is hydrogen bromide and the halogen is bromine.

7. In a process for halogenating an olefin of from 2 to 7 carbon atoms with halogen in a reaction zone the improvement which comprises: diluting the halogen with a liquid hydrogen halide to provide a liquid mixture having a mole ratio of hydrogen halide to halogen of at least 1:1, and to provide a mole ratio of olefin:halogen in excess of 5:1; introducing the liquid mixture into the reaction zone and reacting the olefin with halogen under a pressure between about 400 p.s.i.g. and about 4000 p.s.i.g. and at a temperature of between about 200° C. and 800° C. in the reaction zone to selectively produce the halogenated olefinic derivative of the olefin wherein a hydrogen atom of the olefin has been substituted by a halogen atom of the halogenating mixture.

8. In a process for halogenating propylene with halogen in a reaction zone the improvement which comprises: diluting the halogen with a liquid hydrogen halide to provide a liquid mixture of hydrogen halide:halogen having a mole ratio of from about 1:1 and about 10:1, and to provide a mole ratio of propylene:halogen between about 10:1 and about 20:1; introducing the liquid mixture into the reaction zone and reacting the propylene with the halogen under a pressure of from about 500 p.s.i.g. to about 3000 p.s.i.g. and at a temperature of between about 200° C. and 800° C. in the reaction zone to selectively produce allyl halide as a product of the process.

9. The process of claim 8 wherein the halogen is diluted with a hydrogen halide in a mole ratio of between about 1:1 and about 1:6.

10. The process of claim 8 wherein the halogen is chlorine, the hydrogen halide is hydrogen chloride and the allyl halide is allyl chloride.

11. In a process for halogenating ethylene with halogen in a reaction zone the improvement which comprises: diluting with halogen liquid hydrogen halide to provide a liquid mixture of hydrogen halide:halogen having a mole ratio of from about 1:1 to higher concentration of hydrogen halide, and to provide a mole ratio of ethylene to halogen in excess of 5:1; introducing the liquid mixture into the reaction zone and reacting the ethylene with halogen under a pressure of between about 400 p.s.i.g. and about 4000 p.s.i.g. and at a temperature of between about 200° C. and 800° C. in the reaction zone to produce vinyl halide as a product of the process.

12. The process of claim 11 wherein the halogen is chlorine, the hydrogen halide is hydrogen chloride and the vinyl halide is vinyl chloride.

13. The process of claim 11 wherein the gaseous mixture from the reaction zone containing vinyl halide and hydrogen halide is treated to recover vinyl halide as the product of the process and the hydrogen halide, in the liquid phase is mixed with halogen to provide at least a portion of the liquid mixture fed to the reaction zone.

14. The process of claim 13 wherein the hydrogen halide separated from the vinyl halide in the product recovery is at least partially oxidized to halogen and the halogen thus produced is combined in a controlled amount with hydrogen halide in the liquid phase to provide at least a portion of the liquid mixture fed to the reaction zone.

15. In a process for the halogenation of an olefin of from 2 to 7 carbon atoms with halogen in a reaction zone the improvement which comprises: diluting the halogen with liquid hydrogen halide to provide a liquid mixture having a mole ratio of hydrogen halide to halogen of at least 1:1, and to produce a mole ratio of olefin:halogen in excess of 5:1; introducing the liquid mixture into the reaction zone; reacting the olefin with halogen under a pressure of between about 400 p.s.i.g. and about 4000 p.s.i.g. and at a temperature between about 200° C. and 800° C. in the reaction zone to produce the halogenated olefinic derivative of the olefin in admixture with hydrogen halide, said derivative being the compound wherein a hydrogen atom of the olefin has been substituted by a halogen atom of the halogenating mixture; recovering the halogenated olefinic derivative; condensing the hydrogen halide portion of the mixture and admixing the hydrogen halide portion of the mixture with chlorine in the liquid phase to provide the mole ratio of hydrogen chloride to chlorine employed in the reaction zone and introducing the resulting mixture into the reaction zone.

16. The process which comprises the steps in combination: diluting halogen with liquid hydrogen halide to provide a liquid mixture having a mole ratio of hydrogen halide to halogen of at least 1:1; contacting an olefinic hydrocarbon with the halogenating mixture in an olefin:halogen mole ratio in excess of 5:1; reacting said olefin with said halogen under a pressure at least 400 p.s.i.g. and at a temperature between about 200° C. and 800° C. in a reaction zone to produce an olefinic halogenated product in admixture with hydrogen halide and unreacted olefin; passing the gaseous mixture from the reaction zone to the lower portion of an extraction zone and countercurrently contacting the gaseous mixture with an aqueous solution of hydrogen halide from the upper portion of said extraction zone wherein the halide of the solution is the same as the hydrogen halide of the mixture and the concentration of the halide in the solution is between about 15 percent and about 40 percent by weight halide; extracting substantially all of the hydrogen halide from the gaseous mixture in the aqueous hydrogen halide solution thereby increasing the concentration of the halide in the solution and raising the temperature of said solution by the heat of sorption; withdrawing and passing the hydrogen halide-enriched solution from the lower portion of the extraction zone to a flashing zone; withdrawing the gaseous unsaturated halogenated hydrocarbon product and unreacted olefin from the upper portion of the extraction zone and recovering said unsaturated halogenated hydrocarbon as the product of the process; in the flashing zone, utilizing the heat of sorption to adiabatically flash the hydrogen halide-enriched solution to vaporize and separate the portion of the hydrogen halide absorbed in the extraction zone; recycling the remaining aqueous hydrogen halide solution, at about its original concentration, to the upper portion of the extraction zone at the temperature maintained therein; condensing the flashed hydrogen halide and mixing the condensate with halogen in controlled amount to provide at least a portion of the liquid mixture to the reaction zone.

17. In a process for halogenating an olefin of from 2 to 7 carbon atoms with halogen in a reaction zone the improvement which comprises: diluting the halogen with a liquid hydrogen halide to provide a liquid mixture having a mole ratio of hydrogen halide to halogen of at least 1:1 and to provide a mole ratio of olefin:halogen in excess of 5:1; introducing the liquid mixture into the reaction zone and reacting said olefin with halogen under a pressure of at least 400 p.s.i.g. and at a temperature of between about 200° C. and 800° C. under turbulent mixing conditions during the course of the reaction in the reaction zone to produce the halogenated olefinic derivative of the olefin wherein a hydrogen atom of the olefin has been substituted by a halogen atom of the halogenating mixture.

18. The process of claim 17 wherein turbulent mixing conditions during the course of reaction is at least partially maintained by multi-point jet injection of the liquid mixture along the linear flow path of the olefin.

19. In a continuous process for chlorinating ethylene with chlorine in a reaction zone the improvement which comprises: diluting the chlorine with liquid hydrogen chloride to provide a liquid mixture of hydrogen chloride to chlorine having a mole ratio of hydrogen chloride to chlorine of at least 1:1 and to provide a mole ratio of ethylene to chlorine in excess of 5:1; introducing the liquid mixture into the reaction zone and reacting the ethylene with chlorine under a pressure of at least 400 p.s.i.g. and at a temperature between about 200° C. and 800° C. and under turbulent mixing conditions in the reaction zone to produce an effluent containing vinyl chloride, unreacted ethylene, hydrogen chloride and a minor amount of dichloroethane; separating and recovering the vinyl chloride as a product of the process; separating an unreacted ethylene-hydrogen chloride mixture from the dichloroethane; recycling at least a portion of the unreacted ethylene to the reaction zone as feed thereto; oxidizing at least a portion of the separated hydrogen chloride in the presence of oxygen and ethylene to produce dichloroethane; and passing said dichloroethane in admixture with the recycling ethylene to the reaction zone.

References Cited
FOREIGN PATENTS
1,385,179 11/1964 France.

BERNARD HELFIN, Primary Examiner

J. BOSKA, Assistant Examiner

U.S. Cl. X.R.
260—654, 656